United States Patent
Kim et al.

(10) Patent No.: US 10,453,577 B2
(45) Date of Patent: Oct. 22, 2019

(54) MEASURING DEVICE FOR MICRO FLOW RATE AND NUCLEAR POWER PLANT HAVING THE SAME

(71) Applicant: KOREA ATOMIC ENERGY RESEARCH INSTITUTE, Yuseong-gu, Daejeon (KR)

(72) Inventors: Myungjun Kim, Seongbuk-gu (KR); Joohyung Moon, Daejeon (KR); Heejoon Lee, Seongbuk-gu (KR); Youngin Kim, Daejeon (KR); Keungkoo Kim, Daejeon (KR)

(73) Assignee: KOREA ATOMIC ENERGY RESEARCH INSTITUTE, Yuseong-gu (KR)

( * ) Notice: Subject to any disclaimer, the term of this patent is extended or adjusted under 35 U.S.C. 154(b) by 1304 days.

(21) Appl. No.: 14/855,222

(22) Filed: Sep. 15, 2015

(65) Prior Publication Data
US 2016/0232997 A1    Aug. 11, 2016

(30) Foreign Application Priority Data

Feb. 10, 2015  (KR) .......................... 10-2015-0020402

(51) Int. Cl.
*G21F 1/00*     (2006.01)
*G21C 17/028*   (2006.01)
(Continued)

(52) U.S. Cl.
CPC ........... *G21C 17/028* (2013.01); *G01F 1/007* (2013.01); *G21D 1/00* (2013.01); *H01H 35/24* (2013.01); *G01F 23/683* (2013.01); *Y02E 30/40* (2013.01)

(58) Field of Classification Search
CPC ........ G01F 1/007; G01F 23/683; G01F 23/30; F01F 1/64; H01H 35/18; H01H 35/24; G21C 17/028
See application file for complete search history.

(56) References Cited

U.S. PATENT DOCUMENTS 5,986,554 A  * 11/1999  Furber ................. G01F 23/683
                                                     200/230
2014/0015342 A1 *  1/2014  Milone ................. H01H 35/18
                                                     307/118

FOREIGN PATENT DOCUMENTS

JP          10-153462        6/1998
JP         10153462 A   *   6/1998
(Continued)

OTHER PUBLICATIONS

Kim et al., "Experimental Test of the Concept of Long-term Passive Cooling System of Emergency Cooling Tank," Transactions of the Korean Nuclear Society Autumn Meeting, Pyeongchang, Korea, Oct. 30-31, 2014, 3 pages.

*Primary Examiner* — Lily C Garner
(74) *Attorney, Agent, or Firm* — Scully Scott Murphy and Presser

(57) ABSTRACT

Provided is a device for measuring a micro flow rate. The device includes a container having an internal space for containing a fluid flowing therein and an inflow line and an outflow line formed in communication with the internal space, a fluid level gauge configured to sense whether a level of a fluid collected in the container rises to a predetermined height to conduct or block flow of an electric current, a control valve disposed in the outflow line and configured to open or close the outflow line according to a state in which the control valve is electrically connected to or disconnected from the fluid level gauge such that the outflow line is opened or closed according to a change in the fluid level; and (Continued)

a control unit configured to calculate a micro flow rate of the fluid collected in the container using information acquired from at least one of the fluid level gauge and the control valve.

15 Claims, 7 Drawing Sheets

(51) Int. Cl.
  *G01F 1/00* (2006.01)
  *H01H 35/24* (2006.01)
  *G21D 1/00* (2006.01)
  *G01F 23/68* (2006.01)

(56) References Cited

FOREIGN PATENT DOCUMENTS

| KR | 10-2011-0079447 | 7/2011 |
| KR | 10-1312255 | 9/2013 |

* cited by examiner

MEASURING DEVICE FOR MICRO FLOW RATE AND NUCLEAR POWER PLANT HAVING THE SAME

CROSS-REFERENCE TO RELATED APPLICATIONS

Pursuant to 35 U.S.C. § 119(a), this application claims the benefit of earlier filing date and right of priority to Korean Application No. 10-2015-0020402, filed on Feb. 10, 2015, the contents of which is incorporated by reference herein in its entirety.

BACKGROUND OF THE INVENTION

1. Field of the Invention

The present invention relates to measurement of a micro flow rate of a fluid, and more particularly, to a device for measuring a micro flow rate using a change in a level of the fluid.

2. Background of the Invention

There are many difficulties in measuring a micro flow rate of 2 liters per minute (LPM) or less using a conventional flowmeter. Examples of a method of measuring a flow rate includes a method using ultrasonic waves, a method using a pressure drop, and method of measuring the number of vortices. A method using ultrasonic waves has a limitation in measuring high-temperature multi-phase flow, and a method using a pressure drop may interfere the flow of the fluid because the pressure drop exerts greater influence than the flow rate. And, a the method of measuring the number of vortices has difficulties in measuring the micro flow rate because a vortex needed to measure the micro flow rate cannot be generated.

In particular, it is difficult to measure the flow rate of the condensate water, because the flow rate of condensate water that is generated by collecting vapor through a condensation heat exchanger is too small.

Accordingly, in order to measure a flow rate of a tiny amount of fluid, there is a need to develop a device that may reduce the influence on the flow of fluid and also effectively measure the flow rate of the fluid even for high-temperature multi-phase flow.

SUMMARY OF THE INVENTION

The present invention is to provide a device for measuring a micro flow rate of a fluid using a change in a level of a fluid with a measured time interval.

To achieve these and other advantages and in accordance with the purpose of this specification, as embodied and broadly described herein, there is provided a device for measuring a micro flow rate, the device including a container having an internal space for containing a fluid flowing therein and an inflow line and an outflow line formed in communication with the internal space; a fluid level gauge configured to sense whether a level of a fluid collected in the container rises to a predetermined height to conduct or block flow of an electric current, a control valve disposed in the outflow line and configured to open or close the outflow line according to a state in which the control valve is electrically connected to or disconnected from the fluid level gauge such that the outflow line is opened or closed according to a change in the fluid level; and a control unit configured to calculate a micro flow rate of the fluid collected in the container using information acquired from at least one of the fluid level gauge and the control valve.

In addition, the present invention proposes a device for measuring a micro flow rate of condensate water in order to solve the above-described problem. There is provided a device for measuring a micro flow rate of condensate water in which fluid circulation forms a closed loop, the device including a condenser configured to condense a transferred vapor; a steam generator configured to receive condensate water condensed by the condenser, transform the received condensate water into a vapor, and transfer the transformed vapor to the condenser; and the above-described micro flow rate measuring device disposed between the condenser and the steam generator.

The present invention also proposes a nuclear power plant including a micro flow rate measuring device in order to solve the above-described problem. There is provided a nuclear power plant including a nuclear reactor having a reactor core, a steam generator configured to receive heat generated in the reactor core and transform a coolant flowing though the steam generator into a vapor; a first heat exchanger configured to condense the vapor received from the steam generator; a cooling water storage unit formed to accommodate the first heat exchanger and at least partially immerse the first heat exchanger in cooling water stored therein; a second heat exchanger configured to receive a vapor obtained by vaporizing the cooling water stored in the cooling water storage unit, condense the received vapor to condensate water, and transfer the condensate water to the cooling water storage unit; and the above-described micro flow rate measuring device disposed between the cooling water storage unit and the second heat exchanger.

Furthermore, the present invention also proposes a device for measuring a micro flow rate in order to solve the above-described problem. There is provided a method of measuring a micro flow rate, the method including a first step of measuring a volume of a fluid discharged when a control valve, which receives a closing or opening signal from a fluid level gauge configured to sense a change in a level of a fluid collected by a container, is opened and a time interval between opening or closing times of the control valve; and a second step of calculating a micro flow rate of the fluid collected by the container using the volume of the fluid and the time interval between the opening or closing times of the control valve.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

DETAILED DESCRIPTION OF THE INVENTION

Figure 1A:
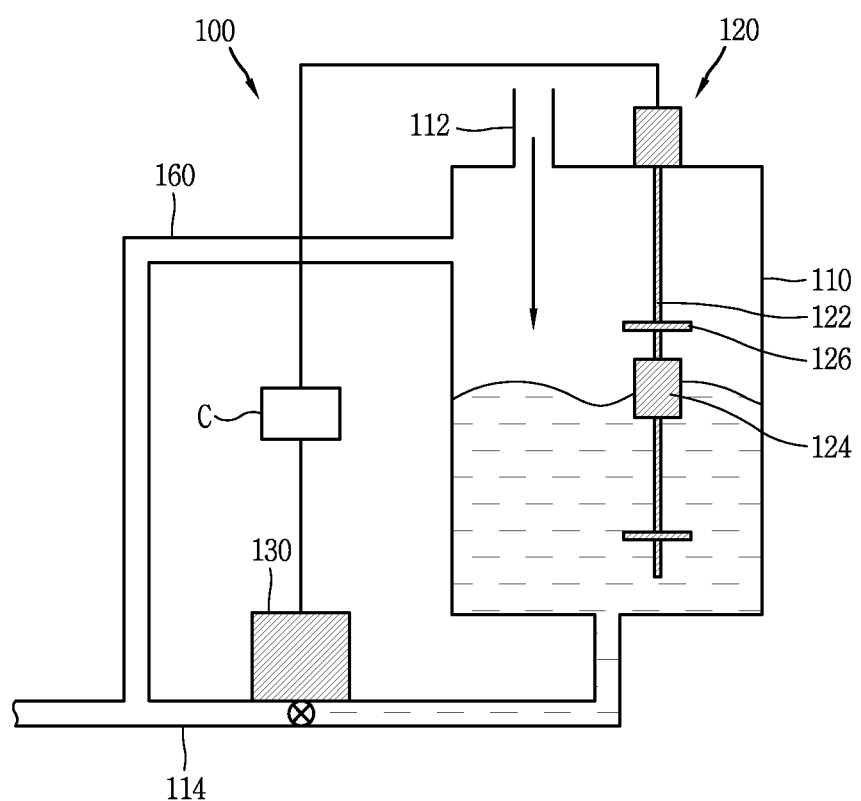
FIG. 1A is a conceptual diagram showing a device for measuring a micro flow rate according to an embodiment of the present invention.

Hereinafter, a micro flow rate measuring device and a nuclear power plant having the same will be described in detail with reference to the accompanying drawings. Herein, like reference numerals denote like elements even in different embodiments, and description for an element appearing first will replace descriptions for like elements appearing later. The singular forms 'a,' 'an,' and 'the' include plural reference unless the context clearly dictates otherwise.

FIG. 1A is a conceptual diagram showing a device 100 for measuring a micro flow rate according to an embodiment of the present invention.

Referring to FIG. 1A, the micro flow rate measuring device 100 according to an embodiment of the present invention includes a container 110, a fluid level gauge 120, a control valve 130, and a control unit (not shown).

The container 110 has an internal space for containing a fluid flowing into the container 110 and has an inflow line 112 and an outflow line 114 that are formed in communication with the internal space. The fluid that flows in the container 110 may be a liquid or gas, and may be stored and contained in the internal space for a certain period of time. Here, the gas may be a vapor in a gaseous state. In addition, the size of the container 110 may be formed to appropriately show a change in a level according to a difference in the volume of the fluid flowing into the container 110.

The fluid level gauge 120 may sense whether the level of the fluid collected to the container 110 through the inflow line 112 rises to a predetermined height to connect or block a flow of an electric current. Here, the fluid level gauge 120 may sense whether the fluid level has risen to the predetermined height by measuring a change in the level of the fluid that flows in the container 110 in real time. The fluid level gauge 120 may be configured to conduct the electric current flow, when the fluid level reaches the predetermined height.

For example, as shown in FIG. 1A, the fluid level gauge 120 may include a rod 122, a moving part 124, and a contact part 126. The rod 122 may be formed to extend in a direction in which the level of the fluid collected in the container 110 rises or drops. The moving part 124 may move back and forth in the extension direction of the rod 122 while floating on the surface of the fluid contained in the container 110. For example, the moving part 124 may be formed of a material having a smaller specific gravity than that of the fluid contained in the container 110. The contact part 126 is disposed to be spaced apart from the moving part 124 floating on the surface of the fluid. The contact part 126 may at least partially come in contact with the moving part 124 when the fluid level is raised by the fluid flowing in the container 110 and may connect a circuit such that an electric current may flow through wires connected with the fluid level gauge 120 when the contact part 126 is in contact with the moving part 124.

In addition, in order to adjust the volume of the fluid discharged through the outflow line 114, the contact part 126 may be configured to able to adjust a separation distance from the moving part 124 in accordance with a change in the supply amount of the fluid flowing in the container 110.

According the above-described configuration of the fluid level gauge 120, when the fluid flowing in the container 110 raises the fluid level to the predetermined height, the moving part 124 connected to the rod 122 moves up as the fluid surface rises and comes in contact with the contact part 126. Subsequently, the fluid level gauge 120 may be connected to pass electronic current. In consideration of failure occurrence, a plurality of the fluid level gauge 120 may be included in the micro flow rate measuring device 100.

When the fluid level rises, the control valve 130 receives a signal from the fluid level gauge 120 to open or close the outflow line 114. In detail, the control valve 130 may be disposed at any portion of the outflow line and electrically connected with the fluid level gauge 120. When the fluid level rises to the predetermined height and thus the flow of the electric current occurs in the fluid level gauge 120, the control valve 130 may open the outflow line 114 to discharge the fluid contained in the container 110 to the outside. On the contrary, when the fluid level drops from the predetermined height and thus the flow of the electric current is blocked in the fluid level gauge 120, the control valve may close the outflow line 114. For example, the control valve 130 may operate in an on-off control manner using two types of signals corresponding to contact or non-contact of the fluid level gauge 120 according to the change in the fluid level.

The control unit (not shown) calculates a micro flow rate of the fluid collected in the container 110 using information acquired from at least one of the fluid level gauge 120 and the control valve 130. For example, the control unit measures the volume of the fluid discharged through the outflow line 114 according to the change in the fluid level and a time interval between opening or closing times of the control valve 130 to provide micro flow rate information. In detail, first, the control unit measures the volume of the fluid discharged through the outflow line 114 when the control valve 130, which operates by receiving a signal from the fluid level gauge 120, is opened. Next, the control unit measures a time from the opening of the control valve 130 and thus the dropping of the fluid level, to the closing of the control valve 130 and thus the rise of the fluid level, and finally to re-opening of the valve. That is, a time interval between opening or closing times of the control valve 130 may be a time taken until the level of the fluid flowing through the inflow line 112 rises again.

In addition, when measuring the time, the control unit may measure a time from the closing of the control valve 130 and thus the rise of the fluid level, to the re-opening of the control valve 130 and thus the drop of the fluid level, and finally to the re-closing of the control valve 130. Here, the volume of the fluid and the time interval between opening or closing times of the control valve 130 may be measured in an order reverse to that described above or at the same time. Subsequently, the control unit may calculate the volume of the fluid flowing in the container 110 per time, that is, the micro flow rate of the fluid using the measured volume of the discharged fluid and the time interval between the opening or closing times of the control valve 130.

According to the above-described configuration of the micro flow rate measuring device 100, the fluid whose flow rate to be measured flows in the internal space of the container via the inflow line 112 and then is contained in the container 110. When the fluid level in the container 110 rises to a predetermined height, the fluid level gauge 120 sense this rise and conducts an electric current to the control valve 130 that is electrically connected. Upon receiving the electric current, the control valve 130 opens the outflow line 114 to discharge the fluid contained in the container 110 to the outside of the container 110. Finally, the control unit may calculate the micro flow rate of the fluid using the volume of the fluid discharged by the rise of the fluid level and the time interval between the opening or closing times of the control valve 130.

The micro flow rate measuring device 100 may further include a detour line 160.

The detour line 160 may be formed to branch from the inflow line 112 or a portion of the container 110, as shown in FIG. 1A, and communicate with the outflow line 114 that is at the backend of the control valve 130 such that a gaseous component included in the fluid flowing into the container 110 may be discharged to the outside and thus removed. The detour line 160 is shown in FIG. 1A as being formed in parallel to the outflow line 114, but may be formed to be inclined toward the outflow line 114 such that the gaseous component flowing in via the inflow line 112 may be smoothly discharged.

Thus, the gaseous component flowing into the container 110 is excluded from a target whose micro flow rate to be measured, thereby increasing reliability of flow rate measurement and preventing a measurement error that may occur due to an increase in pressure inside the container 110 by a gas that is continuously supplied. For example, the measurement error may be an error that occurs in sensing contact by the change in the fluid level because the increased pressure inside the container 110 affects an operation of the fluid level gauge 120. In addition, an occurrence factor of a differential pressure caused by the micro flow rate measuring device 100 may be removed by the detour line 160, thus preventing suppression of a naturally circulated flow rate which leads to the micro flow rate.

The micro flow rate measuring device 100 may further include a sub container 170.

Figure 1B:
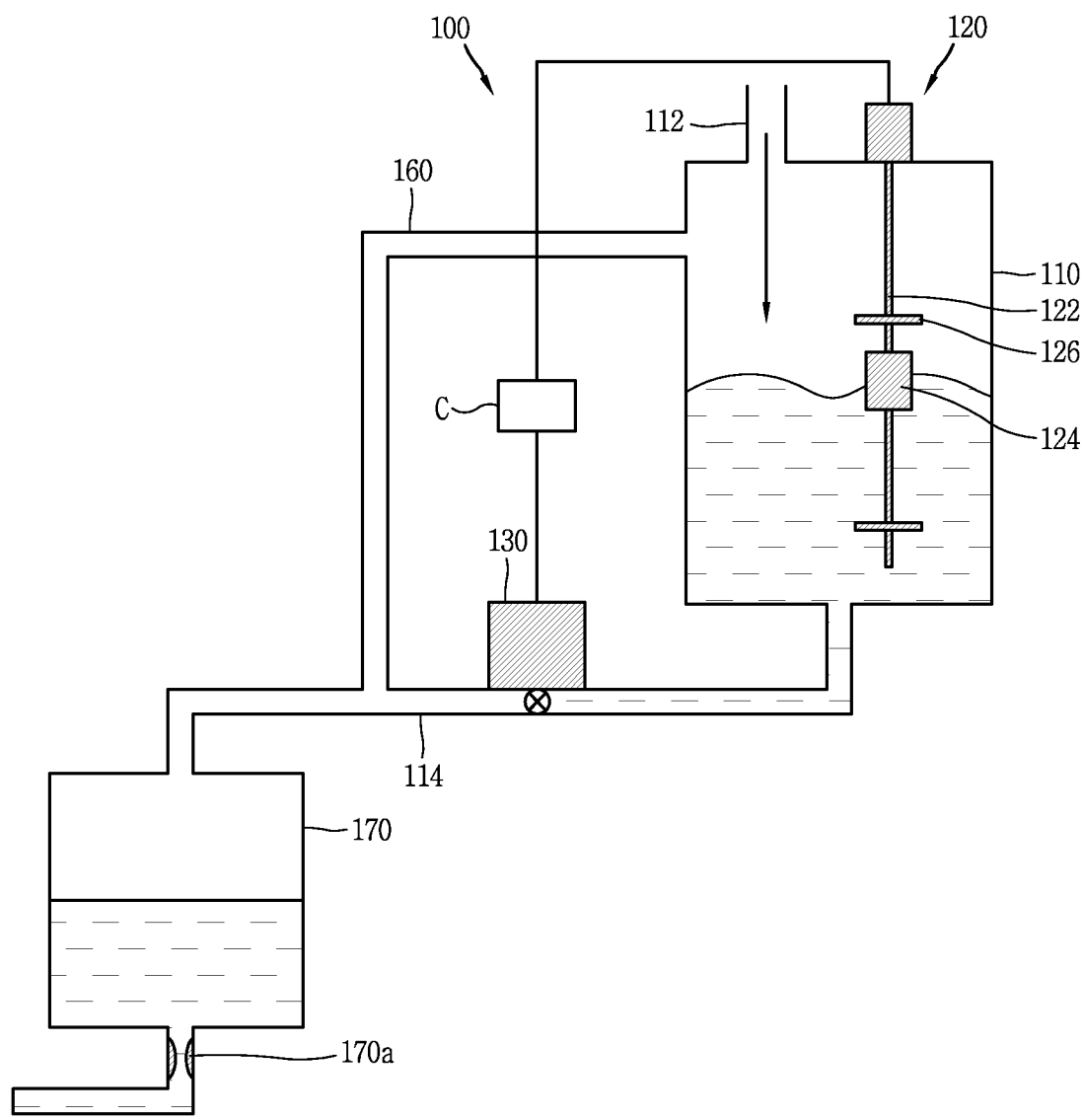
FIG. 1B is a conceptual diagram showing a device for measuring a micro flow rate equipped with a sub container according to an embodiment of the present invention.

The sub container 170 is disposed in any one section of the outflow line 114 and formed to contain the fluid discharged from the container 110 when the control valve 130 is opened. The sub container 170 is shown in FIG. 1B as being disposed lower than the container 110, but may be disposed higher than or at the same height as the container 110. As shown, when the sub container 170 is disposed lower than the container 110, a separate device for transporting the fluid need not be included.

The micro flow rate measuring device 100 may further include a flow rate adjustment unit 170a.

The flow rate adjustment unit 170a may control a flow rate of the fluid discharged from the sub container 170. In detail, the flow rate adjustment unit 170a may be included in an outflow line 114 of the sub container 170 and configured to control a discharge flow rate of the sub container 170 that contains the fluid discharged from the container 110. For example, the flow rate adjustment unit 170a may be formed as an orifice. According to the configurations of the sub container 170 and the flow rate adjustment unit 170a, it is possible to mitigate the rapid variation in the fluid level, which may occur due to the opening of the control valve 130, thus further enhancing system stability.

An orifice, buoyancy, or vortex that is conventionally used for the flow rate measurement causes a large momentum loss when the flow rate is measured. However, the micro flow rate measuring device 100 according to an embodiment of the present invention may effectively measure a micro flow rate while minimizing the resistance of the fluid by using the change in the fluid level caused by opening or closing the outflow line 114 irrespective of high-temperature multi-phase flow.

A mechanism in which the control valve 130 is operated by a relay 140 and a timer 150 will be described below in detail with reference to FIGS. 2A and 2B.

Figure 2A:
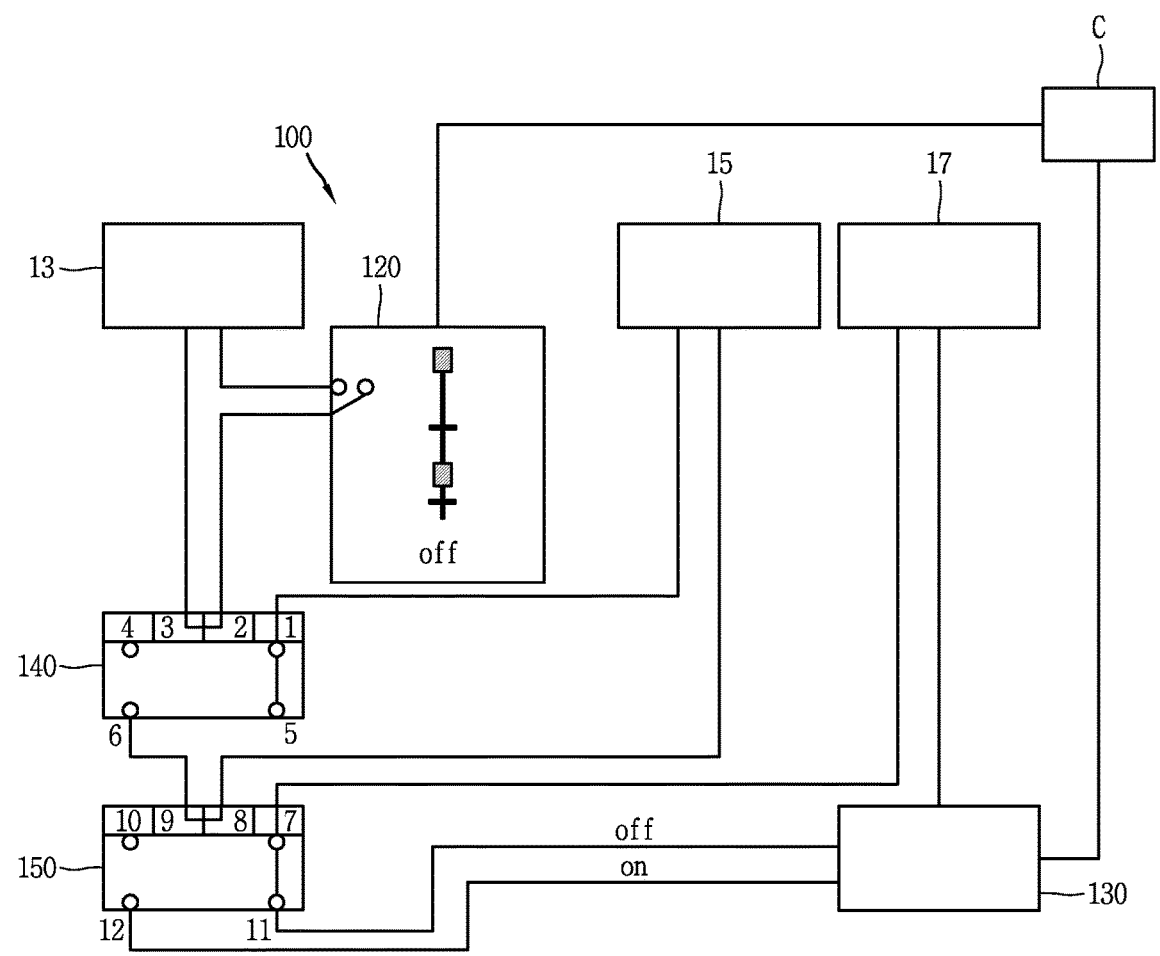
FIG. 2A is a conceptual diagram showing a connection of wires when a fluid level drops by opening a control valve in the micro flow rate measuring device shown in FIG. 1A.
Figure 2B:
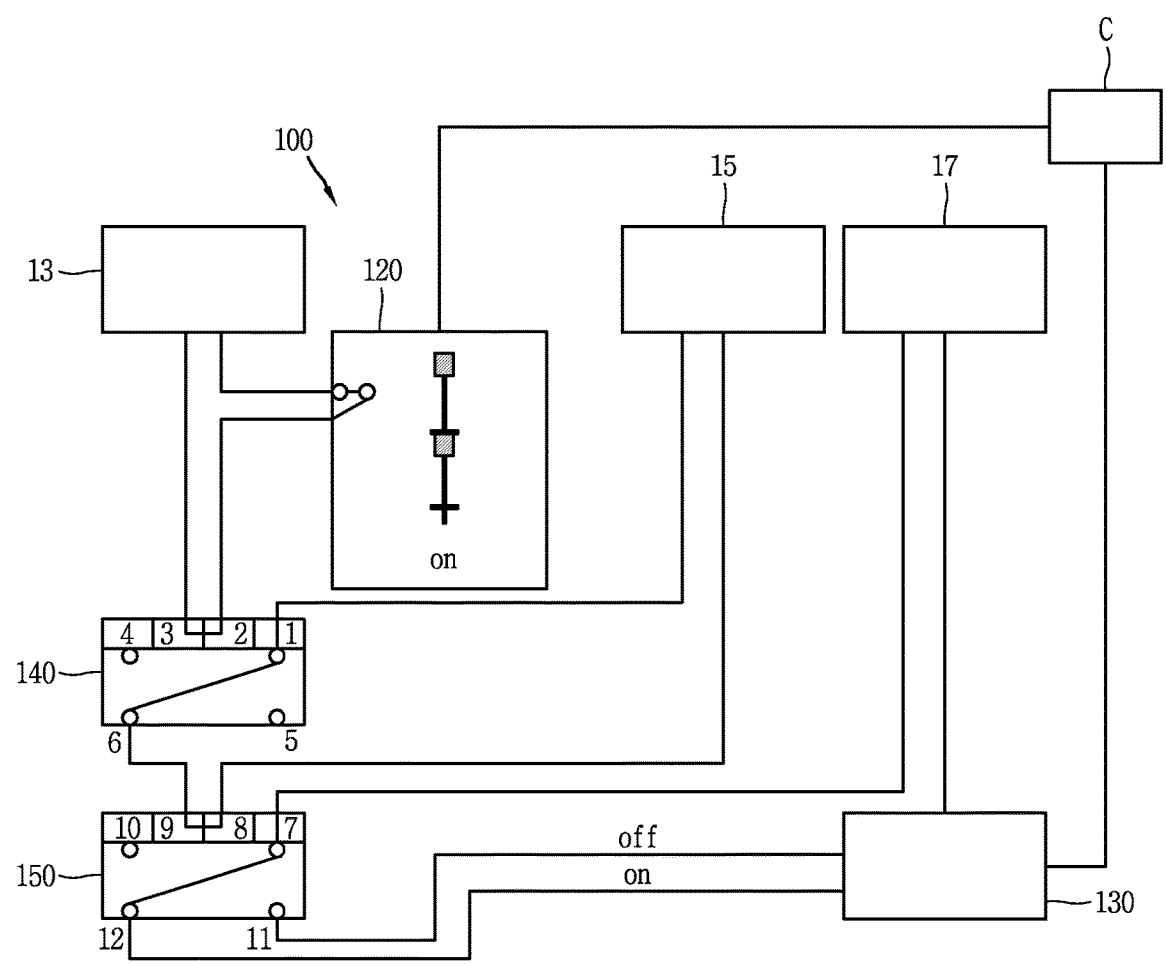
FIG. 2B is a conceptual diagram showing a connection of wires when a fluid level rises to a predetermined height in the micro flow rate measuring device shown in FIG. 1A.

FIG. 2A is a conceptual diagram showing a connection of wires when a fluid level drops by opening a control valve 130 in the micro flow rate measuring device 100 shown in FIG. 1A, and FIG. 2B is a conceptual diagram showing a connection of wires when a fluid level rises to a predetermined height in the micro flow rate measuring device 100 shown in FIG. 1A.

Referring to FIGS. 2A and 2B, the micro flow rate measuring device 100 may further include a relay 140.

The relay 140 is electrically connected between the fluid level gauge 120 and the control valve 130, as shown in FIGS. 2A and 2B, such that, when the fluid level rises to a predetermined height, the relay 140 may sense the rise and open or close the control valve 130 based on the sensing result. When an electric current is applied by a signal of the fluid level gauge 120, the relay 140 may be configured to connect wires to open the control valve 130. For example, the relay 140 may be supplied with power through a first power source 13 connected with a source 2-3 of the relay 140. In this case, as shown in FIG. 2B, when the connection is made by the fluid level gauge 120 such that the electric current flows, the relay 140 may be supplied with the power from the first power source 13 and then the wiring of the relay 140 is changed from 1-5 to 1-6. On the contrary, when the electric current is blocked by the fluid level gauge 120, as shown in FIG. 2A, the wiring of the relay 140 is changed from 1-6 to 1-5. Here, the control valve 130 may be supplied with power from a third power source 17.

The micro flow rate measuring device 100 may further include a timer 150.

The timer 150 is electrically connected between the relay 140 and the control valve 130 to prevent an opening time of the control valve 130 from not being sufficiently secured due to affection by the fluid that continuously flows into the container 110. When the electric current is applied to the relay 140, the timer 150 is supplied with power and configured to connect wires to open the control valve 130. On the contrary, when the electric current is blocked, the timer 150 may be configured not to disconnect the circuit immediately but to maintain the connection of the wires for a predetermined time.

For example, the timer 150 is supplied with power from a second power source 15. When the electric current flows to a source 8-9 of the timer 150 through the relay 140, the timer 150 may be configured to connect wiring 7-12 and disconnect wiring 7-11. On the contrary, when the electric current does not flow into the source 8-9 of the timer 150, the wiring 7-12 is disconnected, and the wiring 7-11 is connected. In this case, unlike the relay 140, the timer 150 delays the time at which the wiring is switched from 7-12 to 7-11 by a predetermined value. In addition, in order to adjust the volume of the fluid discharged through the outflow line 114, the timer 150 may be configured to be able to adjust the delay time for the wiring switching in accordance with a change in the supply amount of the fluid flowing in the container 110. For example, as the supply amount of the fluid increases, the timer 150 may increase the delay time for the wiring switching to increase the volume of the discharged fluid. As the supply amount of the fluid decreases, the timer 150 may decrease the delay time for the wiring switching to decrease the volume of the discharged fluid. The control valve 130 may be supplied with power from the third power source 17.

Here, when the amount of the fluid that is continuously or instantly supplied into the container 110 is increased, the switching to a state in which the fluid level gauge 120 shorts the circuit may occur instantly. In this case, it becomes very difficult to measure the flow rate because the discharge amount of the fluid and the opening and closing times of the control valve 130 are not sufficiently secured. The micro flow rate measuring device 100 including the relay 140 and the timer 150 according to an embodiment of the present invention allows the sufficient change in the fluid level in the container 110 when the fluid level rises to a predetermined height and thus may normally measure the volume of the discharged fluid and the opening and closing times of the control valve 130.

In addition, according to an embodiment of the present invention, the circuit may not be switched by the timer 150 immediately even when the connection of the wires is switched by the change in the fluid level while the control valve 130 is opened, thus preventing the fluid contained in the container 110 from being continuously discharged through the opened outflow line 114 because the control valve 130 does not close the outflow line 114 immediately.

A device 200 for measuring a micro flow rate of condensate water according to another embodiment of the present invention will be described below with reference to FIG. 3.

Figure 3:
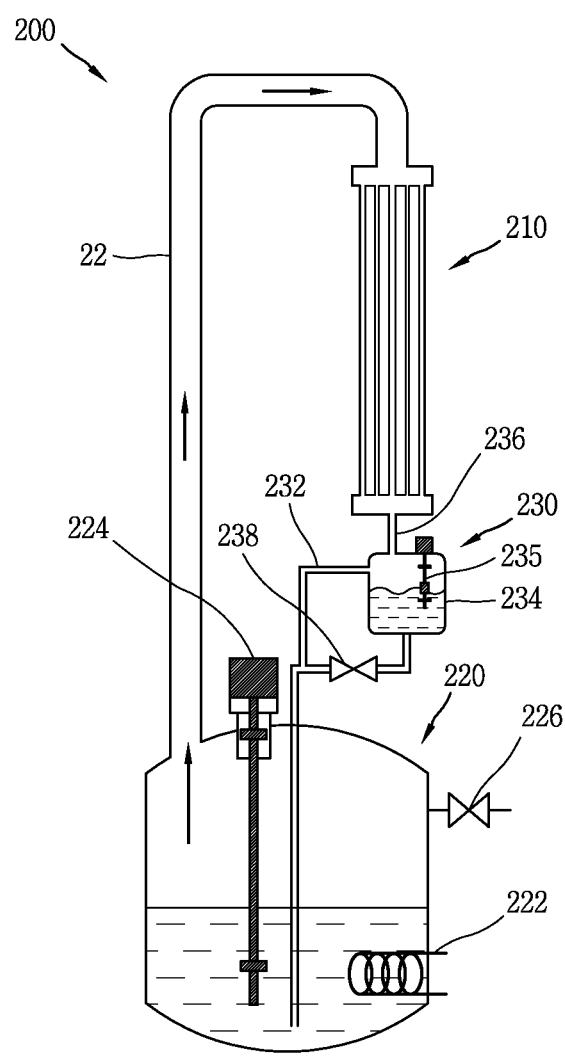
FIG. 3 is a conceptual diagram showing a device for measuring a micro flow rate of condensate water according to another embodiment of the present invention.

FIG. 3 is a conceptual diagram showing the device 200 for measuring a micro flow rate of condensate water according to another embodiment of the present invention.

Referring to FIG. 3, the device 200 for measuring a micro flow rate of condensate water includes a condenser 210, a steam generator 220, and a micro flow rate measuring device 230. In detail, in the device 200 for measuring a micro flow rate of condensate water, the circulation of a fluid forms a closed loop, water with which the steam generator 220 is filled is heated by a heater 222, and water vapor vaporized on the surface or inside water is supplied to the condenser 210 through a connection pipe 22 and then returned as condensate water through thermal exchange. Here, the closed loop denotes a circulation system that allows energy exchange with the outside but prevents materials from coming in and out.

The condenser 210 is configured to condense the water vapor transferred from the steam generator 220. The condenser 210 is shown in FIG. 3 as operating in an air cooling system, but may operate in a water cooling system or water-air hybrid cooling system other than the air cooling system.

The steam generator 220 is configured to receive the condensate water generated by the condenser 210, transform the received condensate water into vapor, and transfer the transformed vapor to the condenser 210. The transferred condensate water may be transformed into the vapor by the heater 222. In addition, the steam generator 220 may include a water level gauge 224 configured to measure the level of water with which the steam generator 220 is filled. In addition, the steam generator 220 may further include a safety discharge valve 226 configured to discharge the vapor to the outside when pressure inside the steam generator 220 rises excessively.

The micro flow rate measuring device 230 is disposed between the condenser 210 and the steam generator 220 and configured to measure a micro flow rate of the fluid generated by the condenser 210. And the micro flow rate measuring device 230 may include a fluid level gauge 235 that sense whether the level of the fluid collected to the container 234 rises to a predetermined height to conduct or block flow of an electric current.

The device 200 for measuring a micro flow rate of condensate water may further include a detour line 232.

The detour line 232 may be formed to branch from an inflow line 236 or a portion of the container 234 and communicate with any portion of the closed loop formed between the control valve 238 and the condenser 210 such that non-condensed vapor flowing from the condenser 210 to a container 234 of the micro flow rate measuring device 230 is circulated through the closed loop. According to the configuration of the detour line 232, vapor in a gaseous state may detour through the closed loop while being sealed from the outside, thus preventing the fluid flowing through the closed loop from being vaporized and then reduced.

A nuclear power plant 300 including a micro flow rate measuring device 360 according to still another embodiment will be described below with reference to FIG. 4.

Figure 4:
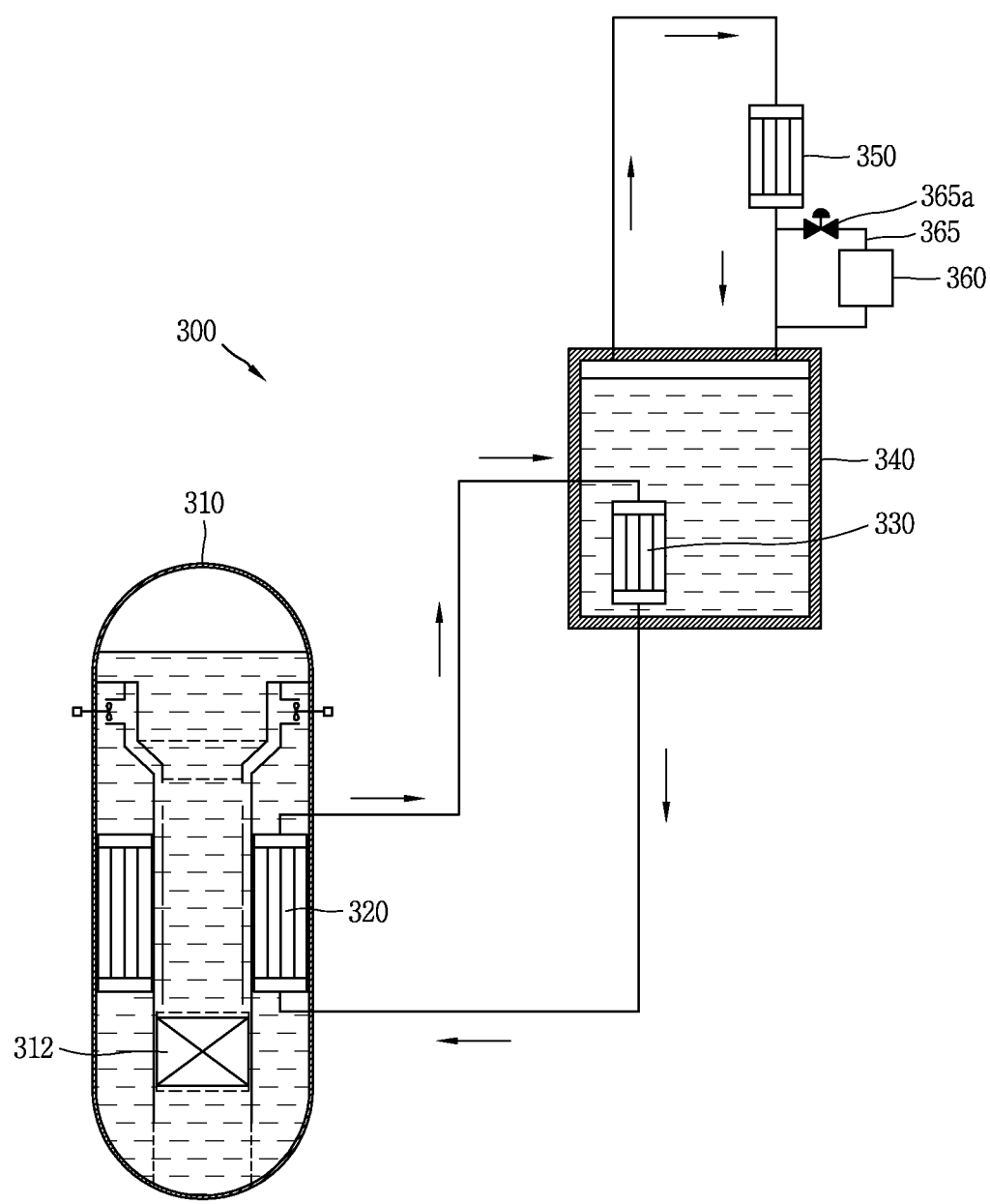
FIG. 4 is a conceptual diagram showing a nuclear power plant including a micro flow rate measuring device according to still another embodiment of the present invention.

FIG. 4 is a conceptual diagram showing a nuclear power plant 300 including a micro flow rate measuring device 360 according to still another embodiment of the present invention.

Referring to FIG. 4, the nuclear power plant 300 including the micro flow rate measuring device 360 includes a nuclear reactor 310, a steam generator 320, a first heat exchanger 330, a cooling water storage unit 340, a second heat exchanger 350, and a micro flow rate measuring device 360.

The nuclear reactor 310 includes a reactor core 312 that generate heat by nuclear fission.

The steam generator 320 is configured to receive the heat generated by the reactor core 312 and transform a coolant flowing though the steam generator 320 into vapor. The steam generator is shown in FIG. 4 as being disposed inside the nuclear reactor 310, but may be disposed outside the nuclear reactor 310.

The first heat exchanger 330 is configured to condense the vapor to condensate water. In detail, the first heat exchanger 330 is formed to receive vapor in a saturated or superheated state from the steam generator 320 and condense the received vapor in order to remove decay heat of the reactor core 312 when an accident occurs such as a loss-of-coolant accident or a non-loss-of-coolant accident. For example, the first heat exchanger 330 may be configured to condense the vapor through heat transfer between two fluids having different temperatures.

The cooling water storage unit 340 may be sealed from the outside and formed to accommodate the first heat exchanger 330. The cooling water storage unit 340 may be disposed to partially or entirely immerse the first heat exchanger 330 in the cooling water, which is the ultimate final heat sink such that the heat exchange is performed by the cooling water stored in the cooling water storage unit 340.

The second heat exchanger 350 may be configured to receive a vapor obtained by vaporizing the cooling water stored in the cooling water storage unit 340, condense the received vapor to condensate water, and transfer the condensate water back to the cooling water storage unit 340. Here, the first heat exchanger 330 may be entirely immersed in the cooling water stored in the cooling water storage unit 340. Alternatively, a portion of the first heat exchanger 330 may be exposed above the water surface due to vaporization of the cooling water. The second heat exchanger 350 may maintain the water level of the cooling water stored in the cooling water storage unit 340 by transforming the vapor vaporized in the cooling water storage unit 340 into the condensate water and transferring the condensate water to the cooling water storage unit 340.

The micro flow rate measuring device 360 may be disposed between the cooling water storage unit 340 and the second heat exchanger 350 and configured to measure a micro flow rate of the condensate water collected by the second heat exchanger 350. And the nuclear power plant 300 may include a branch line 365. In normal operation, the branch line 365 to the micro flow rate measuring device 360 is closed. However, when there is a need to measure a micro flow rate of the condensate water collected by the second heat exchanger 350, the branch line 365 is open. And isolation valve 365a may disposed at a inflow line of the micro flow rate measuring device 360. The isolation valve 365a is configured to open or close the inflow line of the branch line 365.

In order to receive the condensate water generated by the second heat exchanger 350 through natural circulation flow of the fluid caused by a differential head and transfer the received condensate water to the cooling water storage unit 340, the micro flow rate measuring device 360 may be disposed between a lower portion of the second heat exchanger 350 and an upper portion of the cooling water storage unit 340. That is, as shown in FIG. 4, micro flow rate measuring device 360 may be disposed lower than the second heat exchanger 350 to receive the condensate water and disposed higher than the cooling water storage unit 340 to transfer the generated condensate water into the cooling water storage unit 340.

According to the above-described configuration of the nuclear power plant 300 including the micro flow rate measuring device 360, it is possible to effectively predict a flow rate of the condensate water that is generated in micro quantity, thus further enhancing safety of the nuclear power plant 300.

A method of measuring a micro flow rate of a fluid will be described below with reference to FIG. 5.

Figure 5:
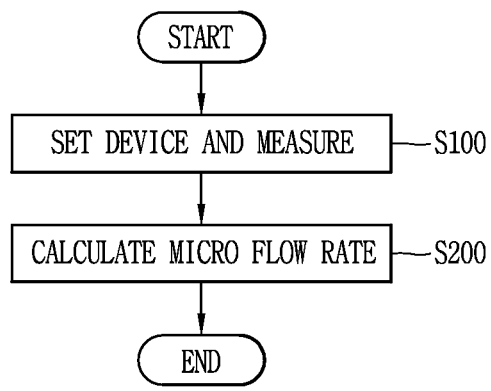
FIG. 5 is a flowchart showing a micro flow rate measuring method according to an embodiment of the present invention.

FIG. 5 is a flowchart showing a micro flow rate measuring method according to an embodiment of the present invention.

Referring to FIG. 5, the micro flow rate measuring method includes a first step S100 of setting a device for measuring a micro flow rate of a fluid and measuring values needed to calculate the micro flow rate and a second step S200 of calculating the micro flow rate from the values measured in the first step S100.

The first step S100 includes measuring a volume of a fluid discharged when the control valve 130 is opened and a time interval between opening or closing times of the control valve 130. In detail, the fluid whose micro flow rate to be measured is formed to contain the fluid in an internal space and is collected in a container 110 including an inflow line 112 and an outflow line 114. Here, the fluid collected in the container 110 may be discharged to the outside of the container 110 when the control valve 130 disposed in the outflow line 114 is opened. When the level of the fluid collected in the container 110 reaches a predetermined height, the control valve 130 is configured to receive an opening or closing signal from a fluid level gauge 120.

Here, when the fluid collected in the container 110 rises to a predetermined height over time, and then the control valve 130 receives a signal from the fluid level gauge 120 and then is opened, the first step S100 includes measuring the volume of the discharged fluid and a time from the opening the control valve 130 to the re-opening thereof or from the closing of the control valve 130 to the re-closing thereof.

The second step S200 includes measuring the volume per unit time of a small amount of fluid that flows into and collected in the container 110 using the volume of the fluid discharged when the control valve 130 is opened and the time interval between the opening or closing times of the control valve 130. In this case, the volume that may be measured may be, for example, a micro flow rate of several liters per minute (LPM).

The first step S100 may include setting a delay time of a timer 140.

The setting of a delay time of a timer 140, which is configured to delay a closing signal of the control valve 130 applied from the fluid level gauge 120 to the control valve 130 when the level of the container 110 rises to a predetermined height, may include setting a delay time value of the timer 140 that delays a state in which the control valve 130 is opened by a predetermined time. Thus, upon the opening of the control valve 130, the volume of the fluid that is discharged to the outside of the container 110 may be adjusted.

The first step S100 may include setting a variation in the fluid level sensed by the fluid level gauge 120. Thus, the frequency of discharges of the fluid collected in the container 110 and the frequency of opening/closing operations of the control valve 130 may be adjusted according to characteristics of the fluid to be measured.

However, the scope of the present invention is not limited to the configurations and methods of the above-described embodiments, and various modifications to the embodiments may be made by selectively combining all or some of the embodiments. It would be obvious that all equivalents, which are modifications, additions, deletions, and replacements in the present invention by those skilled in the art, fall within the scope of the present invention, compared with the scope of the present invention as defined by the following claims.

The above-described configuration according to an embodiment of the present invention may use the fluid level that is changed by opening or closing the outflow line and include the detour line to remove a gaseous component included in the fluid supplied to the container, thus minimizing resistance elements that affects the fluid flow to be measured and obtaining micro flow rate information with high reliability.

In addition, the present invention may include a timer connected between the relay and the control valve. Event when the wiring of the relay is continuously switched due to the fluid that continues to flow into the container, the opening or closing time of the control valve may be sufficiently secured to implement operations of the system more stably.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. A device for measuring a micro flow rate, the device comprising:
 a container having an internal space for containing a fluid flowing therein and an inflow line and an outflow line formed in communication with the internal space;
 a fluid level gauge configured to sense whether a level of a fluid collected in the container rises to a predetermined height, and to conduct or block flow of an electric current depending on whether the level of the fluid rises to the predetermined height;
 a control valve disposed in a part of the outflow line extending from the lower portion of the container and configured to open or close the outflow line according to a state in which the control valve is electrically connected to or disconnected from the fluid level gauge such that the outflow line is opened or closed according to a change in the fluid level and configured to allow or block the discharge of the fluid through the outflow line by operation of opening or closing the outflow line; and
 a control unit configured to calculate a micro flow rate of the fluid collected in the container using information acquired from at least one of the fluid level gauge and the control valve.

2. The device of claim 1, wherein the control unit is configured to measure a volume of fluid discharged when the control valve is opened and a time interval between opening or closing times of the control valve and use the measured volume and time to calculate the micro flow rate of the fluid collected in the container.

3. The device of claim 2, further comprising a relay electrically connected between the fluid level gauge and the control valve and configured to connect wires to open the control valve when an electric current is applied.

4. The device of claim 3, further comprising a timer electrically connected between the relay and the control valve and configured to connect wires to open the control valve when an electric current is applied while maintaining the connection of the wires for a predetermined time when the electric current is blocked.

5. The device of claim 4, wherein the timer is configured to be able to adjust a delay time of wiring switching according to a change in a supply amount of the fluid flowing to the container.

6. The device of claim 1, wherein the fluid level gauge comprises:
 a rod formed to extend in a direction of changing the level of the fluid collected in the container;
 a moving part floated on a surface of the fluid and formed to move back and forth along the rod; and
 a contact part disposed over the moving part and configured to conduct an electric current when the fluid level rises and the moving part comes in contact with the contact part.

7. The device of claim 6, wherein the contact part is configured to be able to adjust a separation distance from the moving part according to a change in a supply amount of the fluid flowing to the container.

8. The device of claim 7, wherein the control valve is configured to operate in an on-off control manner using two types of signals corresponding to contact and non-contact of the fluid level gauge.

9. The device of claim 1, further comprising a detour line formed to branch from the inflow line or a portion of the container and communicate with the outflow line positioned at the backend of the control valve.

10. An apparatus for measuring a micro flow rate of condensate water in which fluid circulation forms a closed loop, the apparatus comprising:
 a condenser configured to condense a transferred vapor;
 a steam generator configured to receive condensate water condensed by the condenser, transform the received condensate water into a vapor, and transfer the transformed vapor to the condenser; and
 the micro flow rate measuring device of claim 1 disposed between the condenser and the steam generator.

11. The apparatus of claim 10, further comprising a detour line formed to branch from the inflow line or a portion of the container and communicate with any one portion of the closed loop formed between the control valve and the condenser.

12. A nuclear power plant comprising:
 a nuclear reactor having a reactor core;
 a steam generator configured to receive heat generated in the reactor core and transform a coolant flowing though the steam generator into a vapor;
 a first heat exchanger configured to condense the vapor received from the steam generator;
 a cooling water storage unit formed to accommodate the first heat exchanger and at least partially immerse the first heat exchanger in cooling water stored therein;
 a second heat exchanger configured to receive a vapor obtained by vaporizing the cooling water stored in the cooling water storage unit, condense the received vapor to condensate water, and transfer the condensate water to the cooling water storage unit; and
 the micro flow rate measuring device of claim 1 disposed between the cooling water storage unit and the second heat exchanger.

13. The nuclear power plant of claim 12, wherein the micro flow rate measuring device is disposed below the second heat exchanger and above the cooling water storage unit.

14. The device of claim 1, further comprising a sub container disposed in the outflow line and formed to contain a fluid discharged when the control valve is opened.

15. The device of claim 14, further comprising a flow rate adjustment unit disposed in an outflow line of the sub container and configured to control a fluid discharged by the sub container.

* * * * *